United States Patent
Kaneda

(10) Patent No.: US 7,830,422 B2
(45) Date of Patent: Nov. 9, 2010

(54) LENS APPARATUS, IMAGE-PICKUP APPARATUS, AND IMAGE-PICKUP SYSTEM

(75) Inventor: Naoya Kaneda, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 653 days.

(21) Appl. No.: 11/470,733

(22) Filed: Sep. 7, 2006

(65) Prior Publication Data

US 2007/0229672 A1  Oct. 4, 2007

(30) Foreign Application Priority Data

Sep. 8, 2005  (JP) ............................. 2005-260335

(51) Int. Cl.
*H04N 5/262* (2006.01)

(52) U.S. Cl. .............................. 348/240.1; 348/333.11; 348/360

(58) Field of Classification Search ............. 348/240.1, 348/240.2, 240.3, 240.99, 360, 333.01, 333.11; 396/55

See application file for complete search history.

(56) References Cited

U.S. PATENT DOCUMENTS

| | | | | |
|---|---|---|---|---|
| 3,868,713 A | * | 2/1975 | Schwarz et al. | 396/460 |
| 4,333,712 A | * | 6/1982 | Tomori | 359/705 |
| 4,508,443 A | * | 4/1985 | Matsuzaki et al. | 396/103 |
| 4,603,955 A | * | 8/1986 | Haneishi | 396/532 |
| 4,814,812 A | * | 3/1989 | Nakajima et al. | 396/227 |
| 4,893,145 A | * | 1/1990 | Matsuda | 396/137 |
| 5,005,047 A | * | 4/1991 | Fujino et al. | 396/298 |
| 5,041,855 A | * | 8/1991 | Takezawa et al. | 396/137 |
| 5,060,005 A | * | 10/1991 | Itoh et al. | 396/303 |
| 5,122,880 A | * | 6/1992 | Nagano | 348/333.13 |
| 5,134,525 A | * | 7/1992 | Kaneda | 359/697 |
| 5,227,829 A | * | 7/1993 | Imanari et al. | 396/133 |
| 5,640,233 A | * | 6/1997 | McArthur et al. | 356/124 |
| 6,130,994 A | * | 10/2000 | Maruyama | 396/60 |
| 6,240,256 B1 | * | 5/2001 | Hozumi et al. | 396/223 |
| 6,546,207 B2 | * | 4/2003 | Wakui | 396/298 |

(Continued)

FOREIGN PATENT DOCUMENTS

JP  9-243899  9/1997

OTHER PUBLICATIONS

Translation of Chinese Office Action dated Mar. 21, 2008 concerning CN Application No. 200610129100.

*Primary Examiner*—Lin Ye
*Assistant Examiner*—Chriss S Yoder, III
(74) *Attorney, Agent, or Firm*—Rossi, Kimms & McDowell LLP

(57) ABSTRACT

Lens apparatuses are disclosed capable of smooth image-pickup operation by facilitating operations of functions provided separately between the lens apparatus and the image-pickup apparatus. The lens apparatus, which is detachably mounted on an image-pickup apparatus, comprises a controller which outputs a signal for controlling a function provided in the image-pickup apparatus in response to operation of a first operating member. The other lens apparatus comprises a controller which outputs a signal for controlling a first function provided in the lens apparatus in response to operation of a second operating member in a case where a first operating member is in a first state and outputs a signal for controlling a second function provided in the image-pickup apparatus in response to operation of the second operating member in a case where the first operating member is in a second state.

1 Claim, 11 Drawing Sheets

U.S. PATENT DOCUMENTS

| | | | |
|---|---|---|---|
| 6,731,339 B2 * | 5/2004 | Ohkawara | 348/347 |
| 6,758,807 B2 * | 7/2004 | Minami | 600/168 |
| 6,937,285 B2 * | 8/2005 | Ohkawara | 348/357 |
| 7,349,013 B2 * | 3/2008 | Kyuma | 348/240.1 |
| 2001/0010559 A1 * | 8/2001 | Hirasawa et al. | 348/350 |
| 2002/0071048 A1 | 6/2002 | Kaneda | |
| 2006/0114341 A1 * | 6/2006 | Morinaga et al. | 348/240.1 |

* cited by examiner

LENS APPARATUS, IMAGE-PICKUP APPARATUS, AND IMAGE-PICKUP SYSTEM

BACKGROUND OF THE INVENTION

The present invention relates to lens apparatuses mountable on image-pickup apparatuses such as video cameras and digital still cameras.

A lot of image-pickup systems are used, each including an image-pickup apparatus equipped with an image-pickup element such as a CCD sensor or a CMOS sensor and a lens apparatus interchangeably mounted on the image-pickup apparatus. Such a lens apparatus has been disclosed in, for example, Japanese Patent Laid-Open application No. H09 (1997)-243899. The disclosed lens apparatus is provided with communication contacts on its mount portion for attaching the lens apparatus to an image-pickup apparatus. The communication contacts form communication paths between a lens side microcomputer and an image-pickup apparatus side microcomputer in the image-pickup system. Exposure information obtained in the image-pickup apparatus is sent to the lens apparatus through the communication paths, and then an iris driver provided in the lens apparatus is operated to perform auto exposure.

Recent image-pickup apparatuses use an image-pickup element capable of high-resolution image pickup, which has four to ten million pixels with a narrower pitch. In addition, image-pickup systems are used, which can record high-definition (HD) images with a much higher resolution than that of conventional television images not only in still image pickup but also in video image pickup.

Such image-pickup systems are often used by professional camera operators, and they generally prefer manual focusing to auto focusing.

In such a situation, correct determination of a manual focusing state through an electronic viewfinder provided on the image-pickup apparatus requires that images displayed on the electronic viewfinder have a resolution equivalent to images to be recorded. However, achieving this requires increasing the size of the electronic viewfinder, resulting in hindering reduction in size, weight and cost of the entire image-pickup apparatus.

As a method for enabling the correct determination of the manual focusing state through the electronic viewfinder, a function to display an enlarged image of the central part of the picked up image in response to operator's operation can be employed. Specifically, an operating switch is provided, which enables changing display mode setting between a normal display mode for displaying a normal-sized image to grasp the entire picked up image and a large display mode for displaying an enlarged image of part of the picked up image to confirm the focusing state.

However, manual focusing is performed in response to rotational operation of a focus ring provided on the lens apparatus. On the other hand, the operating switch to change the display mode between the normal display mode and the large mode is generally provided on the image-pickup apparatus equipped with the electronic viewfinder. In this case, the camera operator has to move his/her hand widely between the lens apparatus side and the image-pickup apparatus side when operating the focus ring and changing the display modes. This makes operation difficult, thereby hindering smooth image pickup.

Japanese Patent Laid-Open application No. H09(1997)-243899 has disclosed a technique to perform optical zooming in the lens apparatus and electronic zooming in the image-pickup apparatus seamlessly in response to operation of a zoom ring provided on the lens apparatus. Also in this image-pickup system, a switch to turn on and off the electronic zooming function is provided on the image-pickup apparatus. Therefore, the camera operator has to release his/her hand from the zoom ring and then move it widely to the image-pickup apparatus as in the above-described operation to change the display mode between the normal and large display modes. In other words, the operation becomes difficult, thereby hindering smooth image pickup.

Furthermore, there is a case where a lens apparatus is provided with a manual ring for operating an aperture stop, and an image-pickup apparatus is provided with an electronic shutter function (that is, a function to change the charge accumulation time of the image-pickup element) and a switch for setting this function. In this case, the operation becomes difficult since the operating members are separated from each other between the lens apparatus side and the image-pickup apparatus side, though both are provided for functions relating to the same exposure control.

BRIEF SUMMARY OF THE INVENTION

An object of the present invention is to provide a lens apparatus, an image-pickup apparatus and an image-pickup system, which are capable of smooth image pickup operation by facilitating operations of functions provided separately between the lens apparatus and the image-pickup apparatus.

According to one aspect, the present invention provides a lens apparatus, which is detachably mounted on an image-pickup apparatus. The lens apparatus comprises a first operating member, and a controller which outputs a signal for controlling a function provided in the image-pickup apparatus in response to operation of the first operating member.

According to another aspect, the present invention provides a lens apparatus, which is detachably mounted on an image-pickup apparatus. The lens apparatus comprises a first operating member, a second operating member, and a controller which outputs a signal for controlling a first function provided in the lens apparatus in response to operation of the second operating member in a case where the first operating member is in a first state, and outputs a signal for controlling a second function provided in the image-pickup apparatus in response to operation of the second operating member in a case where the first operating member is in a second state.

According to yet another aspect, the present invention provides an image-pickup apparatus comprising a controller which controls the function (or the second function) in response to the signal input from the above-described lens apparatus.

According to a further aspect, the present invention provides an image-pickup system comprising the above-described lens apparatus and an image-pickup apparatus which includes a controller that controls the function (or the second function) in response to the signal input from the lens apparatus.

Other objects and features of the present invention will become apparent from the following description and the attached drawings.

DETAILED DESCRIPTION OF THE PREFERRED EMBODIMENTS

Preferred embodiments of the present invention will hereinafter be described with reference to the drawings.

Embodiment 1

Figure 1:
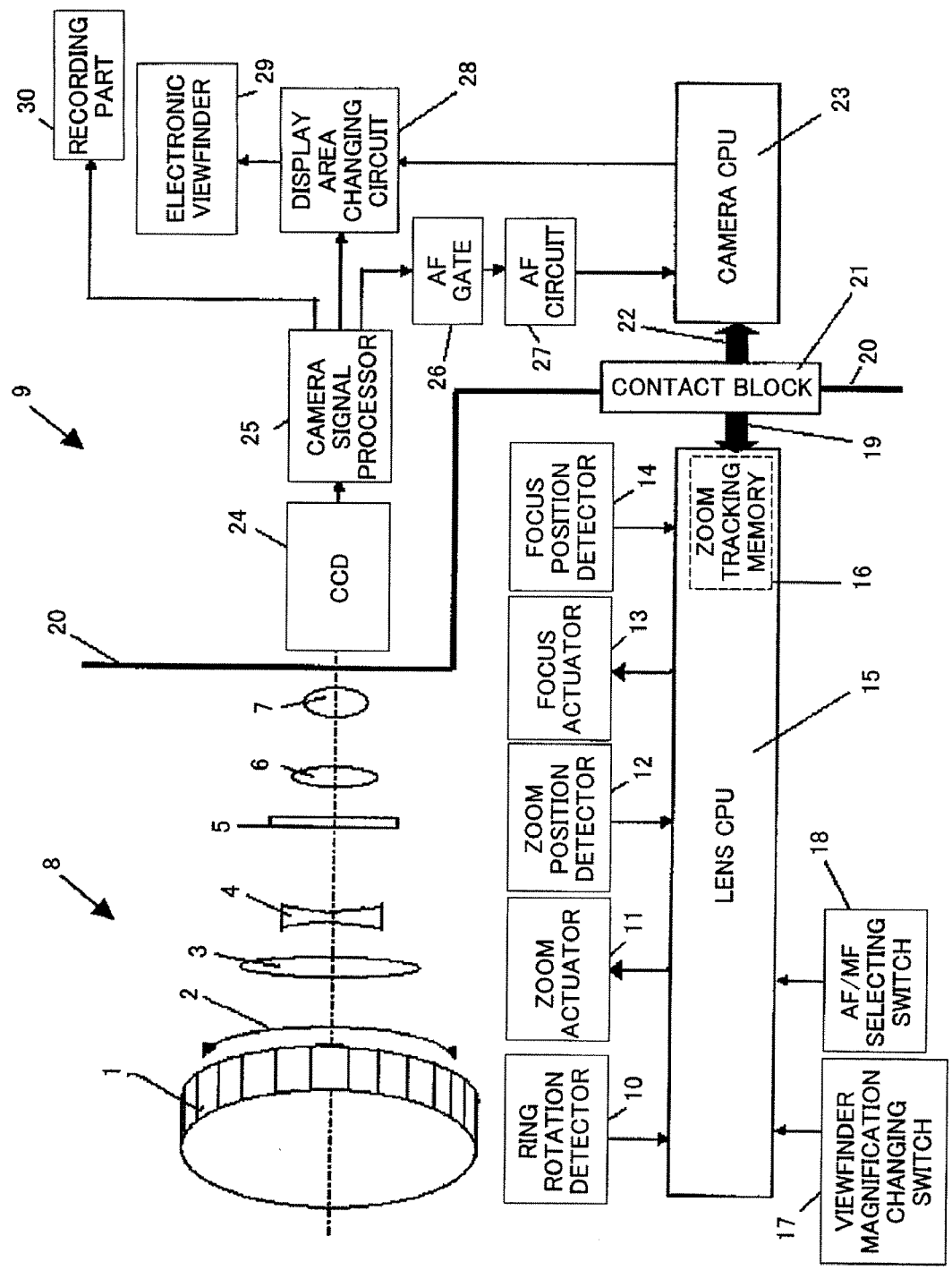
FIG. 1 is a block diagram showing the configuration of the image-pickup system that is Embodiment 1 of the present invention.

FIG. 1 shows the configuration of an image-pickup system that is Embodiment 1 of the present invention. The image-pickup system is constituted by an image-pickup apparatus (hereinafter referred to as a camera) 9 such as a video camera and a single-reflex digital camera, and an interchangeable lens (lens apparatus) 8 which is detachably mounted on the camera 9. The line 20 in FIG. 1 shows the boundary between the interchangeable lens 8 and the camera 9.

The description will be made of the configuration of the interchangeable lens 8 first. In FIG. 1, 1 denotes a focus ring that is a second operating member, which is rotationally operated around a lens barrel of the interchangeable lens 8. 2 denotes the rotation direction of the focus ring 1.

3, 4, 6 and 7 denote lens units which constitute a zoom image-pickup optical system in the interchangeable lens 8. The image-pickup optical system is a four-lens-unit rear-focus type optical system that is generally used in video cameras. The lens type in the present invention, however, is not limited thereto.

3 denotes a fixed front lens unit which has positive optical power, 4 a magnification-varying lens unit (variator lens) which moves in an optical axis direction to vary the magnification of the image-pickup optical system, 6 a fixed afocal lens unit. 7 denotes a focus lens unit which moves in the optical axis direction for focusing and compensating variation of the image plane that accompanies the magnification varying.

5 denotes an aperture stop unit which is located between the magnification-varying lens unit 4 and the afocal lens unit 6. The aperture diameter of the aperture stop unit 5 is changed to adjust the amount of light reaching the image plane.

10 denotes a ring rotation detector which detects the rotation direction and the rotation amount or the rotation speed of the focus ring 1. The ring rotation detector 10 outputs, for instance, a rectangular-wave signal generated by passage of plural comb-like protrusions formed on the focus ring 1 through a light-emitting portion and a light-receiving portion of a photointerrupter, not shown. Counting pulses in the rectangular-wave signal or monitoring the input interval of the rectangular-wave signal enables detection of the rotation direction and the rotation amount or the rotation speed of the focus ring 1. A variable resistor or the like, regardless of structure and principle, may be used as the ring rotation detector 10.

11 denotes a zoom actuator which is a stepping motor, a voice coil type linear actuator in which a magnet or a coil moves linearly in the optical axis direction, or the like.

12 denotes a zoom position detector which detects the position of the magnification-varying lens unit 4 in the optical axis direction. In a case where the zoom actuator 11 is a stepping motor, counting driving pulses of the stepping motor after a power-on reset of the magnification-varying lens unit 4 to the initial position, for instance, enables the detection of the position thereof. The reset to the initial position is performed by detecting insertion of a light-shielding portion formed on the magnification-varying lens unit 4 between a light-emitting portion and a light-receiving portion of a photointerrupter, not shown. A magnetic or optical encoder may be used as the zoom position detector 12.

13 denotes a focus actuator which is a stepping motor, a voice coil type linear actuator in which a magnet or a coil moves linearly in the optical axis direction, or the like.

14 denotes a focus position detector which detects the position of the focus lens unit 7 in the optical axis direction in the same manner as the zoom position detector 12. A magnetic or optical encoder may be used as the focus position detector 14.

15 denotes a lens CPU as an interchangeable lens side controller. The lens CPU 15 determines states of the position detectors and switches to control each actuator and to communicate with a camera CPU, described later.

16 denotes a zoom tracking memory provided in the lens CPU 15. The memory 16 stores information relating to positions of the focus lens unit 7 according to the positions of the magnification-varying lens unit 4 and object distances. Keeping the positional relationship between the magnification-varying lens unit 4 and the focus lens unit 7 according to this information when varying the magnification enables zooming with an in-focus state maintained.

17 denotes a viewfinder magnification changing switch that is a first operating member, which will be described later.

18 denotes an AF/MF selecting switch to change focus mode setting between an AF (auto focus) mode and an MF (manual focus) mode.

21 denotes a contact block provided in a mount portion where the interchangeable lens 8 is connected to the camera 9. Arrows 19 and 22 shown in FIG. 1 denote that communications are performed via the contact block 21.

Next, the description of the configuration of the camera 9 will be made. 23 denotes the camera CPU that is a camera side controller, which governs control of operations of the camera 9.

24 denotes an image-pickup element such as a CCD sensor and a CMOS sensor (shown as 'CCD' in the figure), which photoelectrically converts an object image formed by the image-pickup optical system.

25 denotes a camera signal processor which performs predetermined processes such as gain adjustment and gamma correction on the outputs from the image-pickup element 24 to generate a video signal. The video signal is sent to an electronic viewfinder, described later, and displayed as a video image. The video signal is output to a recording part 30 and recorded on a recording medium such as a semiconductor memory, an optical disk and a magnetic tape.

26 denotes an AF gate which takes a video signal component from the central part of the picked up image.

27 denotes an AF circuit which extracts a predetermined frequency component from the video signal component taken by the AF gate 26 to generate an AF evaluation value signal corresponding to contrast of the video image. The so-called contrast detection AF (TV-AF) is performed by driving the focus lens unit 7 so that the AF evaluation value signal reaches its greatest value.

28 denotes a display area changing circuit which changes the image area displayed on the electronic viewfinder 29 of the video signal. For instance, it can change display mode setting between a 'normal mode' in which the entire picked up image is displayed and a 'large mode' in which the central area of the picked up image is enlarged. The area displayed in the large mode is not limited to the central area. The area may be set by a camera operator.

The description of the viewfinder magnification changing switch 17 will be made. This switch 17 is operated to control the display size (magnification) changing function of the display area changing circuit 28 provided in the camera 9 for changing the display mode between the normal mode and the large mode. When manual focusing is selected by the AF/MF selecting switch 18, in response to the operation of the viewfinder magnification changing switch 17 to the normal mode side or the large mode side, the lens CPU 15 sends that information (operation signal) to the camera CPU 23 via the contact block 21.

The camera CPU 23 causes the display area changing circuit 28 to display the video image with a normal size or an enlarged size on the electronic viewfinder 29 according to the received information. The enlarged size may be an arbitrary size such as the double of the normal size, or may be set by the camera operator.

Next, the description will be made of the operations of the lens CPU 15 and the camera CPU 23 with reference to FIGS. 2 and 3.

Figure 2:
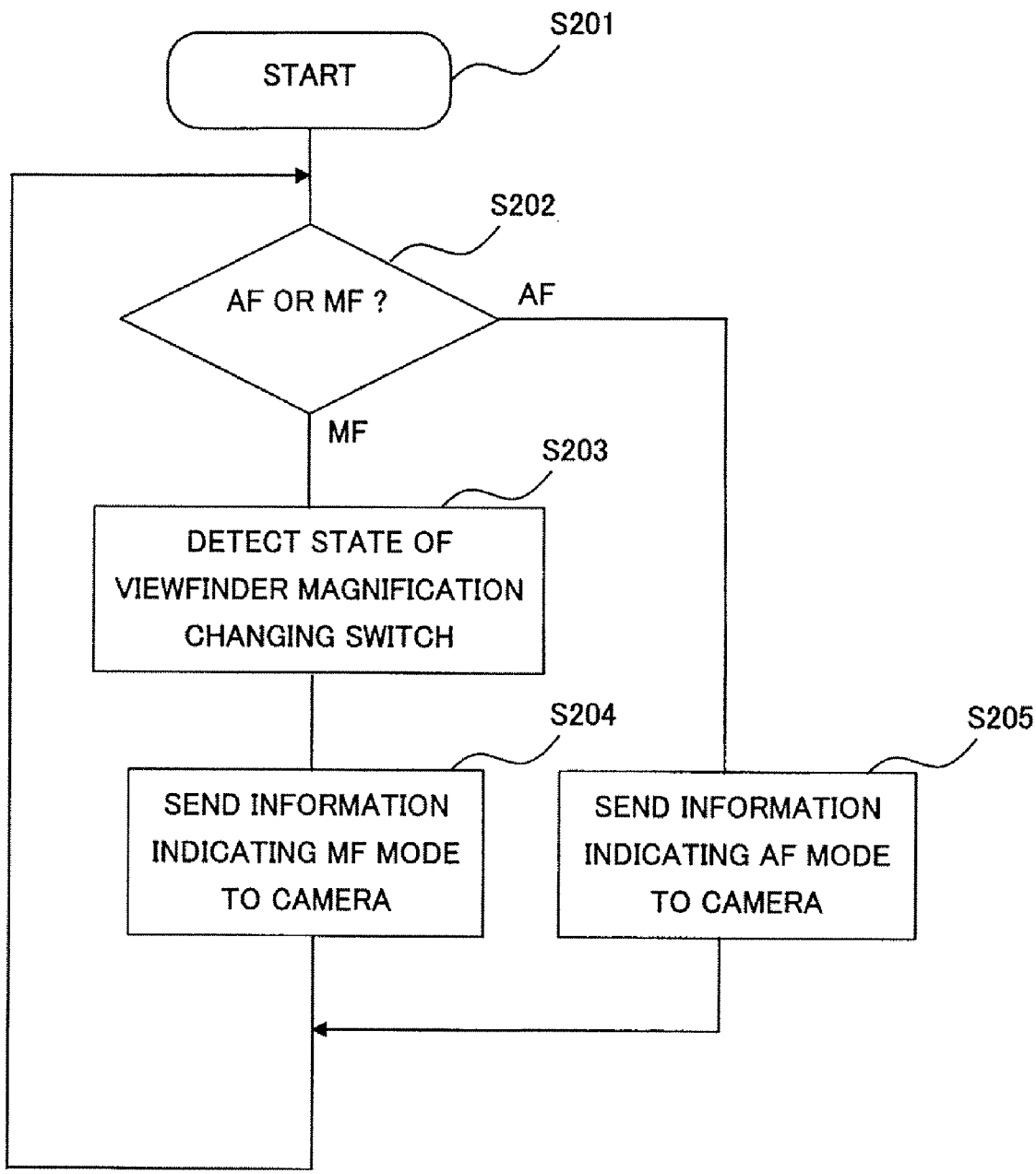
FIG. 2 is a flowchart showing the operation of the lens CPU in Embodiment 1.

The lens CPU 15 starts its operation at step (abbreviated as 'S' in the figure) 201 shown in FIG. 2 first. At step 202 the lens CPU 15 detects the state of the AF/MF selecting switch 18. The process proceeds to step 205 when the AF mode is selected, the lens CPU 15 sends information indicating that the AF mode is selected to the camera CPU 23.

In this case the lens CPU 15 does not accept the operation of the viewfinder magnification changing switch 17. In other words, the control of the change of the normal/large modes of the electronic viewfinder 29 from the lens side is prohibited in the AF mode.

This is because focusing with a certain degree of high accuracy is performed by AF, so that the enlarged display is less necessary to confirm the focusing state. This is also for preventing changeover of the display size of the electronic viewfinder 29 caused by an erroneous operation of the viewfinder magnification changing switch 17 by the operator not intending to perform manual focusing. The camera operator might misunderstand that the changeover of the display size in this case is caused by the optical zooming performed in the lens 8 or the electronic zooming performed in the camera 9. The process returns from step 205 to step 202.

On the other hand, if the MF mode is selected at step 202, the process proceeds to step 203.

At step 203, the lens CPU 15 detects the state (normal mode or large mode) of the viewfinder magnification changing switch 17. Then, at step 204 the lens CPU 15 sends information indicating that the MF mode is selected and the viewfinder magnification changing switch 17 is set to the normal or large mode to the camera CPU 23. The signal showing the state of the viewfinder magnification changing switch 17 is the signal for controlling the display area changing circuit 28 provided in the camera 9. Then, the process returns to step 202.

This process is executed every 1/60 seconds which corresponds to a field period in NTSC, for instance, and the states of the AF/MF selecting switch 18 and the viewfinder magnification changing switch 17 are sent from the lens 8 to the camera 9 in each process.

Figure 3:
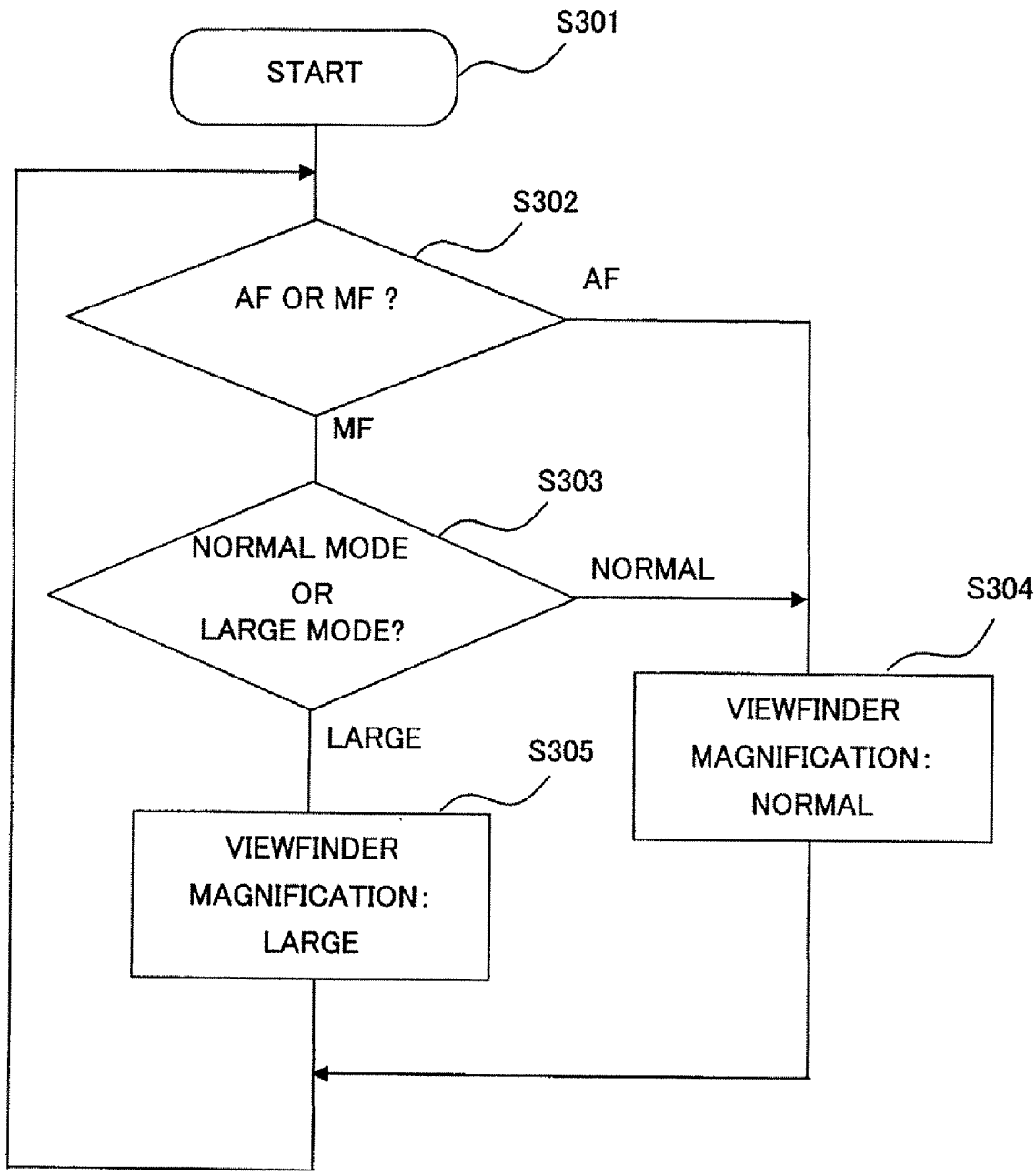
FIG. 3 is a flowchart showing the operation of the camera CPU in Embodiment 1.

On the other hand, the camera CPU 23 starts its operation at step 301 shown in FIG. 3. At step 302 the camera CPU 23 determines whether the selected focus mode is the AF mode or the MF mode according to the information received from the lens 8. If the AF mode is selected, the process proceeds to step 304 to cause the display area changing circuit 28 to display the video image with the normal size.

If the MF mode is selected at step 302, the camera CPU 23 determines the state of the viewfinder magnification changing switch 17 according to the information received from the lens 8 at step 303. If the state is the normal mode, the process proceeds to step 304 to cause the display area changing circuit 28 to display the video image with the normal side as in the AF mode.

If the state is the large mode, the process proceeds to step 305 to cause the display area changing circuit 28 to display the video image with the enlarged size on the electronic viewfinder 29. Thereby, since the enlarged central part of the picked up video image is displayed, it is possible to focus more accurately on the object whose enlarged image is displayed. The process returns from steps 304 and 305 to step 302.

Figure 4:
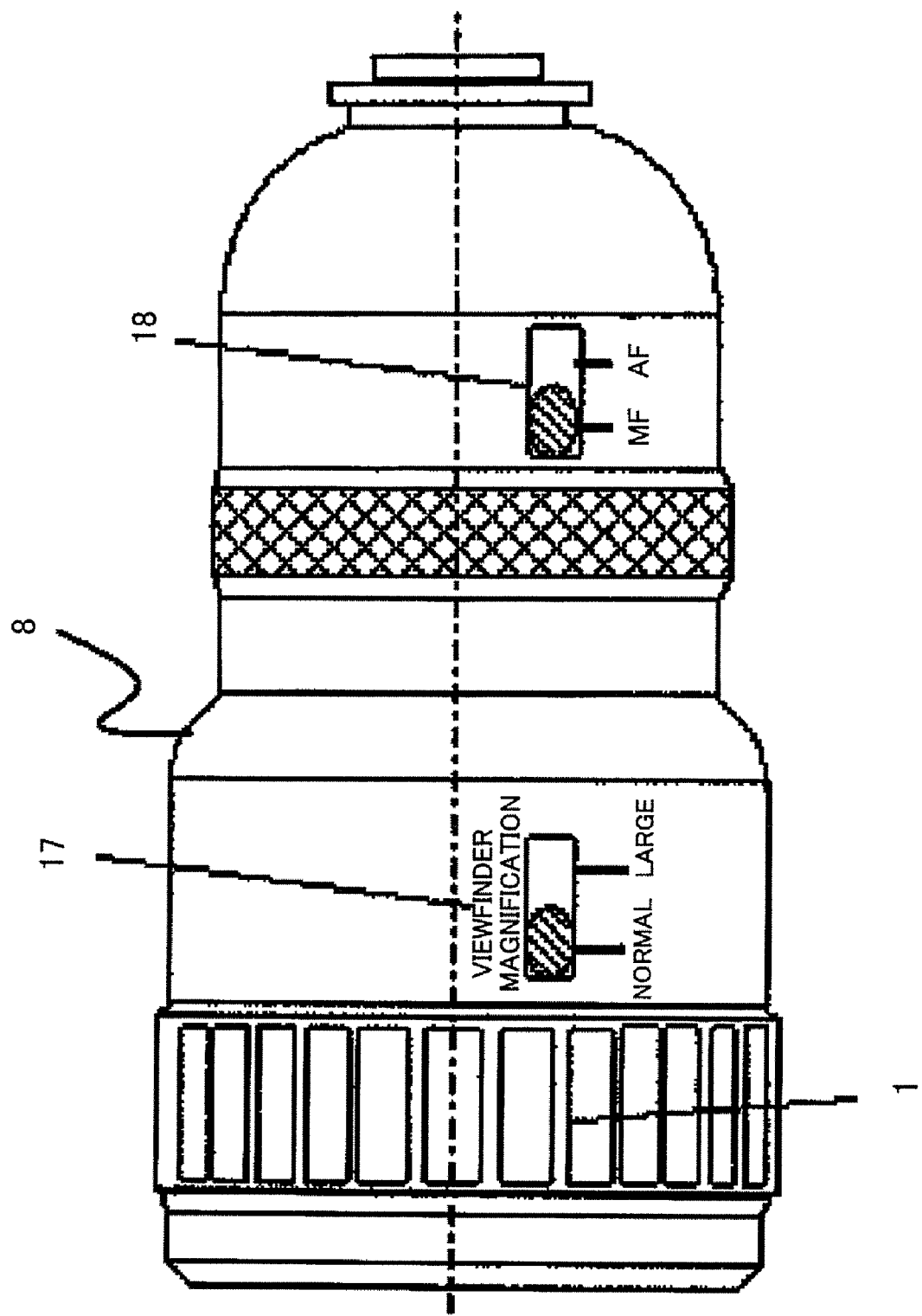
FIG. 4 is an external view of the interchangeable lens in Embodiment 1.

FIG. 4 shows an exterior of the interchangeable lens 8 in this embodiment. The viewfinder magnification changing switch 17 has two switching positions corresponding to the normal mode and the large mode. The AF/MF selecting switch 18 has two switching positions corresponding to the AF mode and the MF mode.

The viewfinder magnification changing switch 17 is located in a region where operation thereof by the thumb of an operator's hand (generally the left hand) placed on the focus ring 1 is performed when operating manual focusing. In other words, the viewfinder magnification changing switch 17 is located at a position closer to the focus ring 1 than to the AF/MF selecting switch 18. Since the display size changing function of the electronic viewfinder 29 is used with manual focusing, such a location enables smooth image pickup.

Although the description was made of the case where the display size (display magnification) on the electronic viewfinder 29 was changed between two sizes 'normal' and 'large', the display magnification may be changed between three or more ones. In this case, the number of the switching positions of the viewfinder magnification changing switch 17 may be increased according to the number of the display magnifications.

In addition, although the description was made of the case where the changeover of the display size in response to operation of the viewfinder magnification changing switch 17 was not performed in the AF mode, the present invention is not necessarily limited thereto. In other words, the changeover of the display size through the viewfinder magnification changing switch 17 may be performed in both the MF and AF modes.

Embodiment 2

Figure 5:
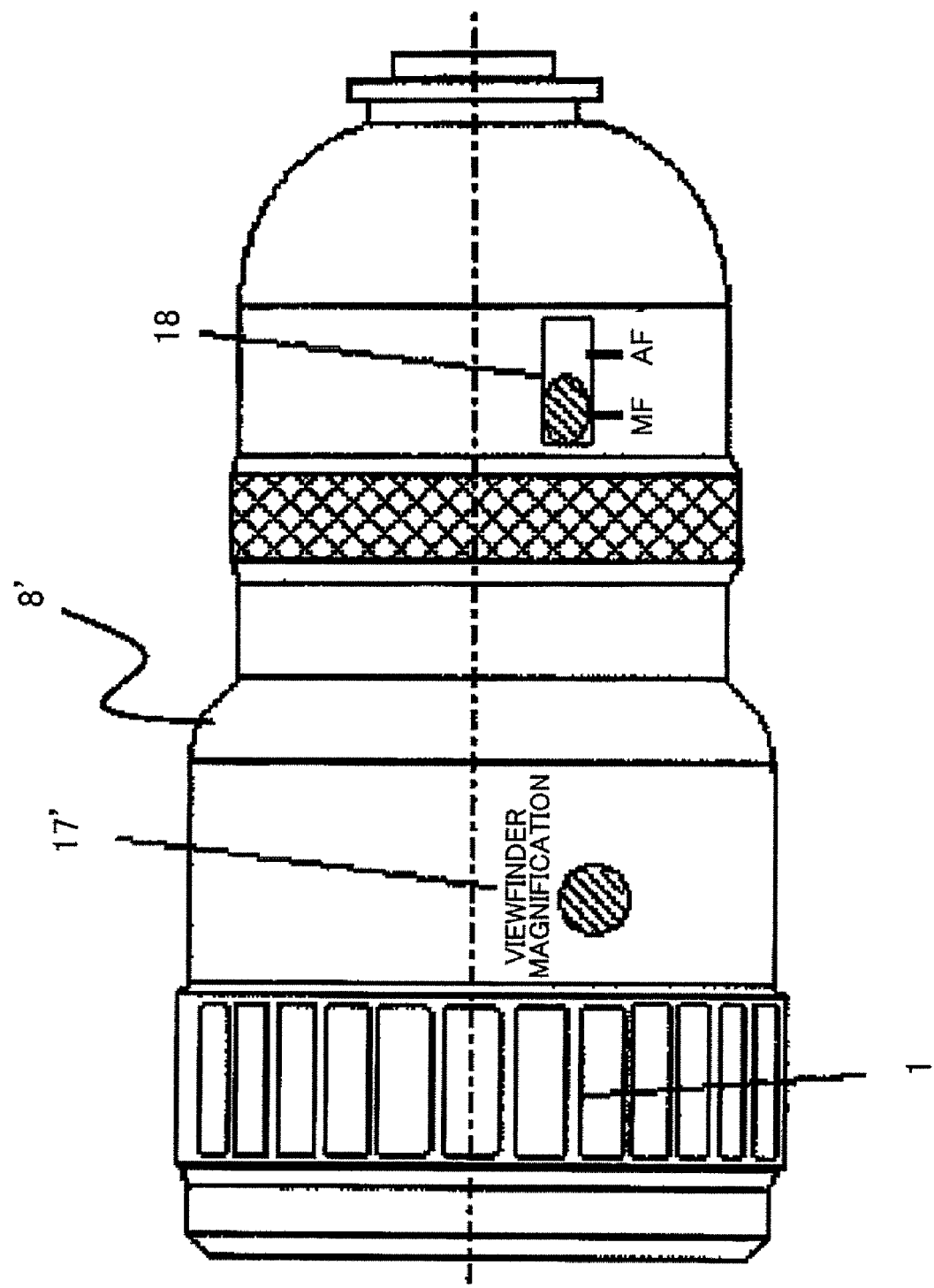
FIG. 5 is an external view of the interchangeable lens that is Embodiment 2 of the present invention.

FIG. 5 shows the exterior of an interchangeable lens 8' that is a modified example of Embodiment 1. Although Embodiment 1 has the viewfinder magnification changing switch 17 that is a two-position switch, this embodiment has a viewfinder magnification changing switch 17' that is a push switch.

In this Embodiment a normal-sized video image is displayed on the electronic viewfinder 29 provided on the camera 9 before pushing the viewfinder magnification changing switch 17'. When pushing the viewfinder magnification changing switch 17', a large (enlarged)-sized video image is displayed on the electronic viewfinder 29 for a predetermined time period, and then the normal-sized video image is displayed.

An AF/MF selecting switch 18 is a switch having two switching positions 'MF mode' and 'AF mode' as that of Embodiment 1.

In addition, the viewfinder magnification changing switch 17' is located in a region where operation thereof by the thumb of an operator's hand (generally the left hand) placed on the focus ring 1 is performed when operating manual focusing. In other words, the viewfinder magnification changing switch 17' is located at a position closer to the focus ring 1 than to the AF/MF selecting switch 18.

Next, the description will be made of the operations of a lens CPU 15 and a camera CPU 23 with reference to FIGS. 6 and 7. The configuration in this embodiment is the same as that described in Embodiment 1 except for the viewfinder magnification changing switch 17'. Thus, the common constituent elements are designated with the same reference numerals as in Embodiment 1.

Figure 6:
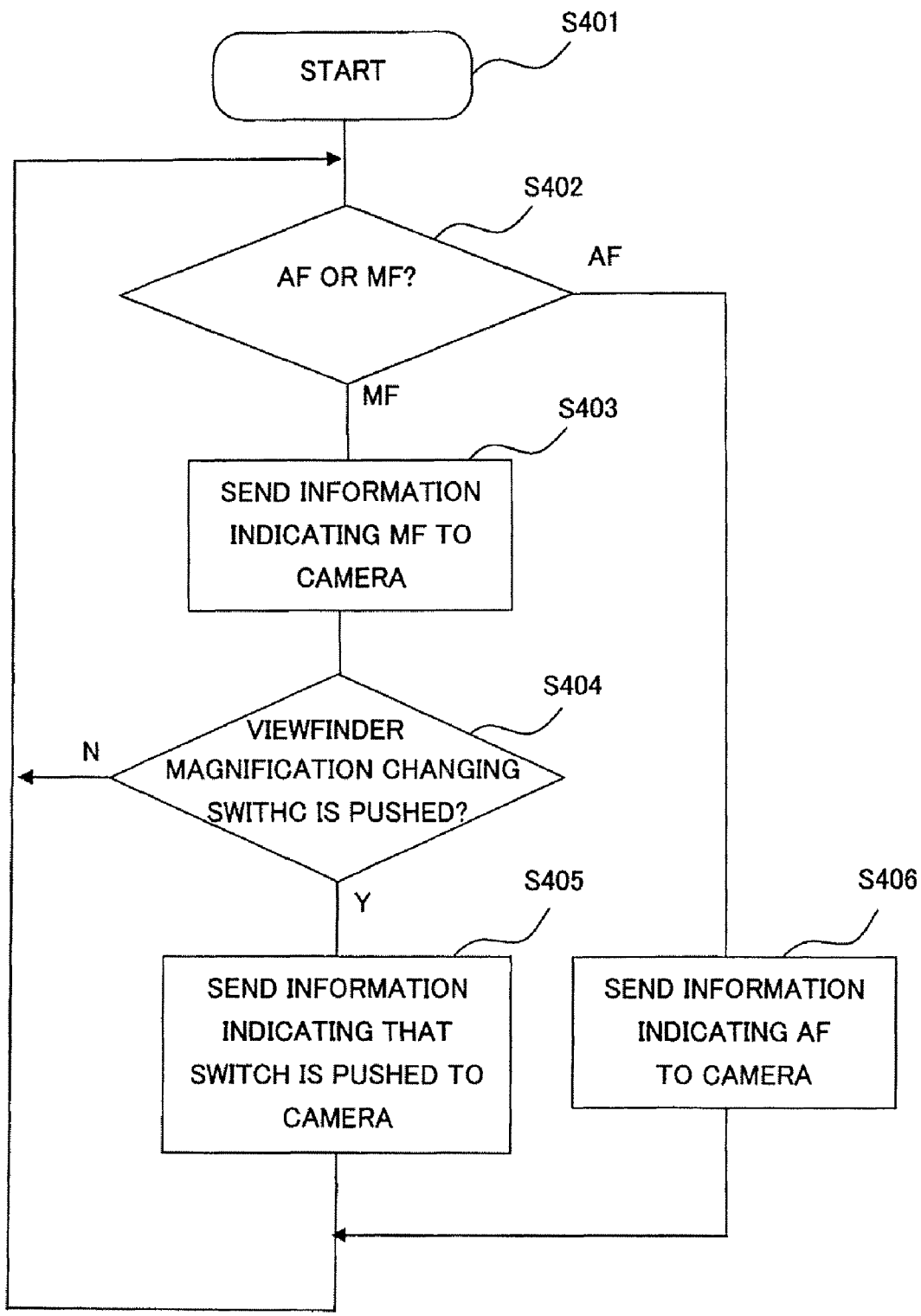
FIG. 6 is a flowchart showing the operation of the lens CPU in Embodiment 2.

The lens CPU 15 starts its operation at step 401 shown in FIG. 6 first. At step 402 the lens CPU 15 detects the state of the AF/MF selecting switch 18. The process proceeds to step 406 when the AF mode is selected, the lens CPU 15 sends information indicating that the AF mode is selected to the camera CPU 23. In this case, the lens CPU 15 does not accept the operation of the viewfinder magnification changing switch 17'. The reason is the same as that described in Embodiment 1.

On the other hand, if the MF mode is selected at step 402, the process proceeds to step 403.

At step 403 the lens CPU 15 sends information indicating that the MF mode is selected to the camera CPU 23.

Next, at step 404, the lens CPU 15 determines whether or not the viewfinder magnification changing switch 17' is operated (pushed). If not operated, the process returns to step 402. If operated, the process proceeds to step 405. This process is executed every 1/60 seconds which corresponds to a field period in NTSC, for instance, and the states of the AF/MF selecting switch 18 and the viewfinder magnification changing switch 17' are sent from the lens 8' to the camera 9 in each process.

At step 405 the lens CPU 15 sends information indicating that the viewfinder magnification changing switch 17' is operated to the camera CPU 23. The signal indicating the operation of the viewfinder magnification changing switch 17' is the signal for controlling the display area changing circuit 28 provided in the camera 9.

Figure 7:
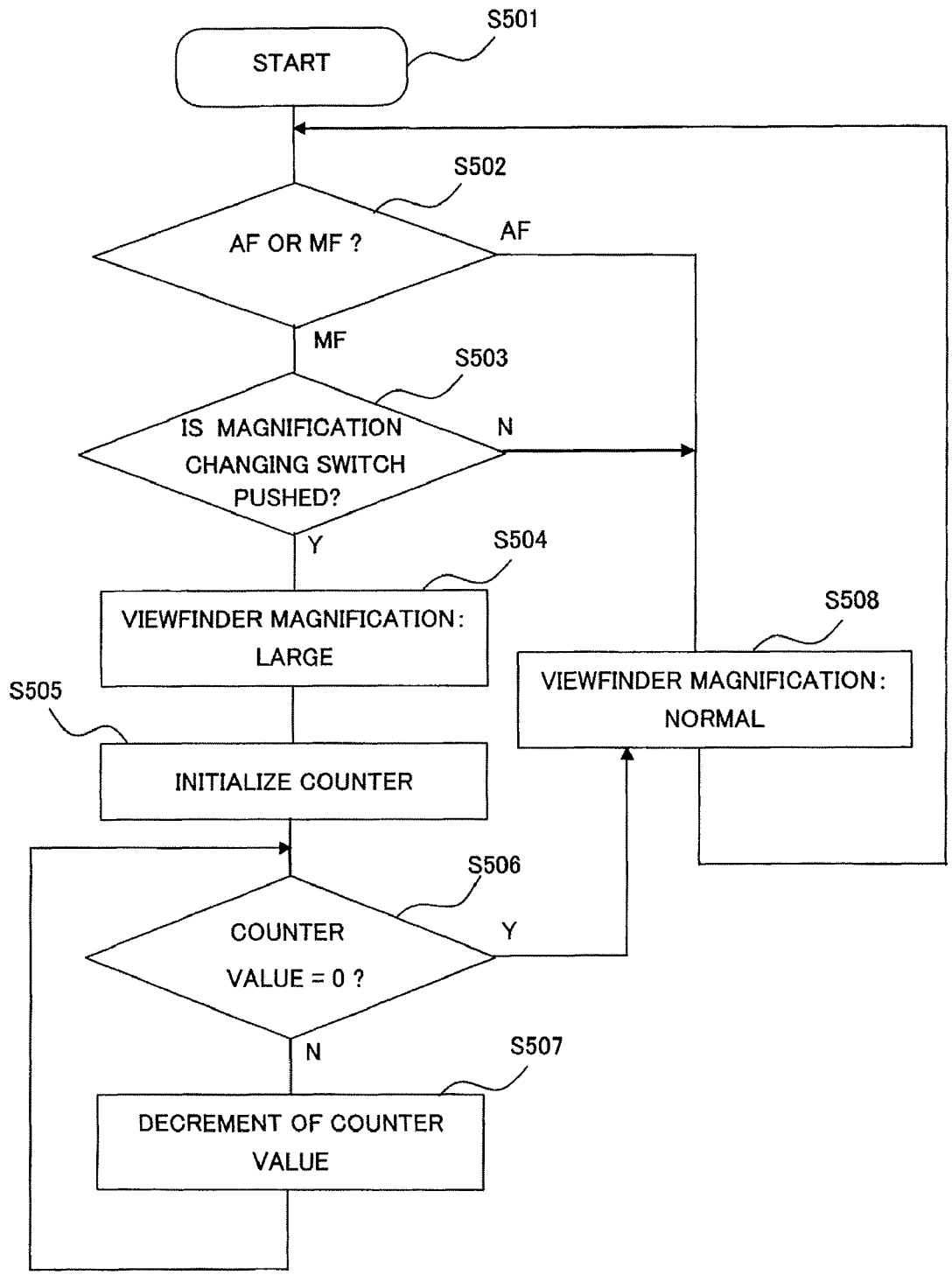
FIG. 7 is a flowchart showing the operation of the camera CPU in Embodiment 2.

On the other hand, the camera CPU 23 starts its operation at step 501 shown in FIG. 7. At step 502 the camera CPU 23 determines whether the selected focus mode is the AF mode or the MF mode according to the information received from the lens 8'. If the AF mode is selected, the process proceeds to step 508 to cause the display area changing circuit 28 to display the video image with the normal size. Then, the process proceeds to step 502.

If the MF mode is selected at step 502, the camera CPU 23 determines whether or not the viewfinder magnification changing switch 17' is pushed according to the information received from the lens 8' at step 503. If not pushed, the process proceeds to step 508 to cause the display area changing circuit 28 to display the video image with the normal side as in the AF mode. If the viewfinder magnification changing switch 17' is pushed at step 503, the process proceeds to step 504 to cause the display area changing circuit 28 to display the video image with the enlarged size. Thereby, since the enlarged central part of the picked up video image is displayed, it is possible to focus more accurately on the object whose enlarged image is displayed.

Further, at step 505, the camera CPU 23 initializes its counter. Next, the camera CPU 23 determines whether or not the counter value is decreased to zero. If not decreased to zero, the process proceeds to step 507 to decrease the counter value by one, and then returns to step 506. This process is also executed every 1/60 seconds which corresponds to a field period in NTSC, for instance, and the zero determination of the counter value and the decrement thereof are repeated with the period.

If the counter value is decreased to zero, the process proceeds from step 506 to step 508. At step 508 the camera CPU 23 causes the display area changing circuit 28 to display the video image with the normal size. Then, the process proceeds to step 502. Thus, the display mode automatically returns from the large mode to the normal mode, and then the process returns to step 502.

Although the description was made of the case where the display magnification on the electronic viewfinder 29 was changed between the normal and large magnifications, the display magnification may be changed between three or more ones. In this case, the display with a first magnification larger than the normal magnification, the display with a larger magnification than the first magnification and the display with the normal magnification may be performed in response to first, second and third operations of the viewfinder magnification changing switch 17', respectively.

In addition, although the description was made of the case where the changeover of the display magnification in response to operation of the viewfinder magnification changing switch 17' was not performed in the AF mode, the present invention is not necessarily limited thereto. In other words, the changeover of the display magnification through the viewfinder magnification changing switch 17' may be performed in both the MF and AF modes.

Embodiment 3

The descriptions were made of the cases where the display magnification of the electronic viewfinder provided on the camera was controlled by the viewfinder magnification changing switch provided on the lens in Embodiments 1 and 2. In contrast, this embodiment shows a case where an optical zooming function provided in the lens and an electronic zooming function provided in the camera are operated from the lens side.

Figure 8:
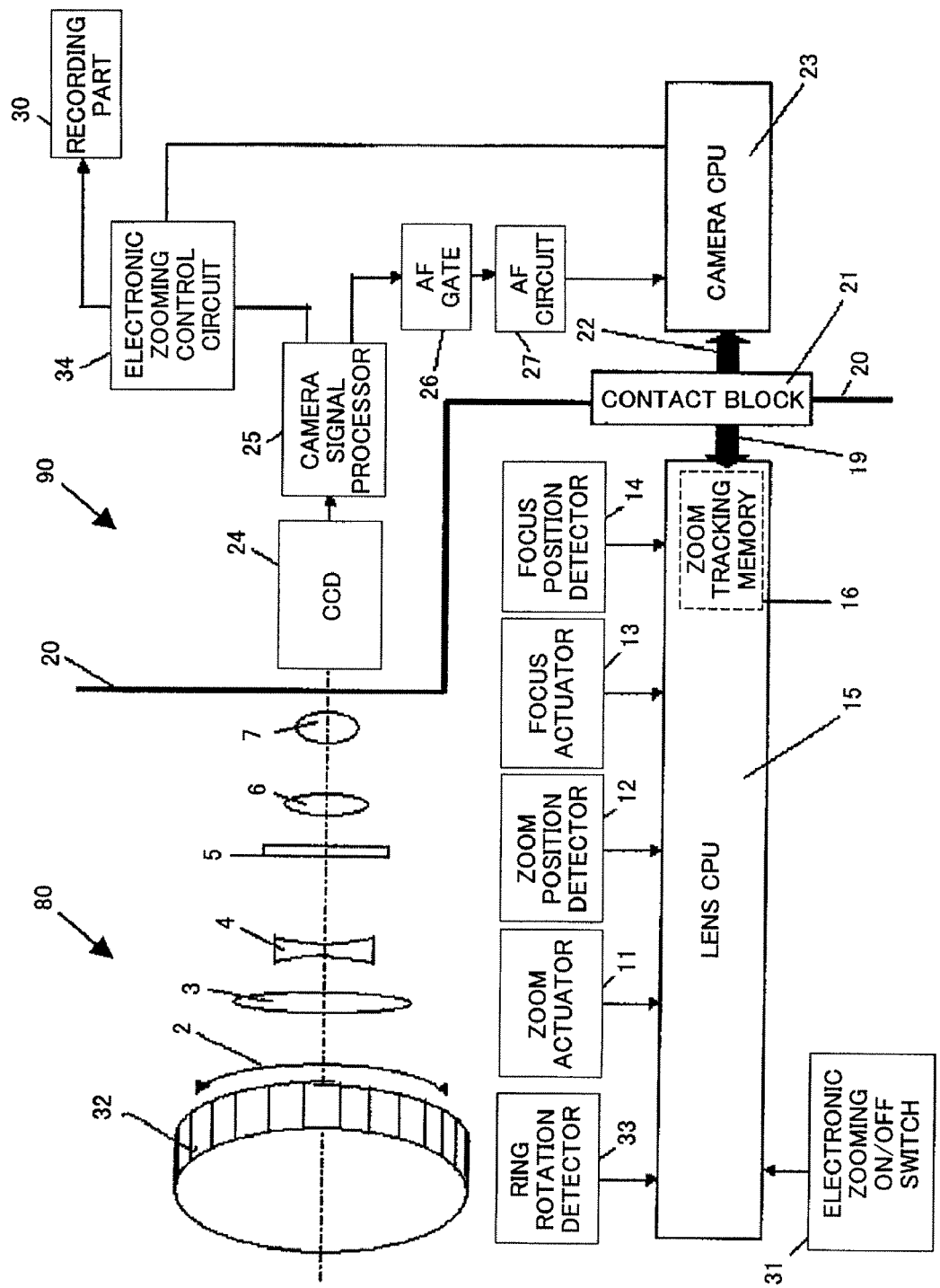
FIG. 8 is a block diagram showing the configuration of the image-pickup system that is Embodiment 3 of the present invention.

FIG. 8 shows the configuration of an image-pickup system that is Embodiment 3 of the present invention. The constituent elements common with those shown in FIG. 1 are designated with the same reference numerals as in FIG. 1.

In an interchangeable lens 80, 31 denotes an electronic zooming ON/OFF switch (or a first operating member) which has two switching positions ON and OFF. A camera operator operates the switch 31 to control ON (use) and OFF (nonuse) of the electronic zooming function provided in a camera 90.

The electronic zooming function is a function to obtain a zooming effect by varying the displaying and recording area of the picked up image generated by using an image-pickup element 24. Electronic zooming is generally used in a case where an image is displayed and recorded with a larger magnification than the maximum magnification corresponding to the telephoto end that can be obtained by optical zooming of an image-pickup optical system.

32 denotes a zoom ring (second operating member) which is rotationally operated for zooming. 33 denotes a ring rotation detector which detects the rotation of the zoom ring 32. The ring rotation detector 33 is similar in construction to the ring rotation detector 10 described in Embodiment 1.

In the camera 90, 34 denotes an electronic zooming control circuit which controls image processing for the above-described electronic zooming function. Other constituent elements are the same as those of Embodiment 1.

Next, the description will be made of the operations of a lens CPU 15 and a camera CPU 23 with reference to FIGS. 9 and 10.

Figure 9:
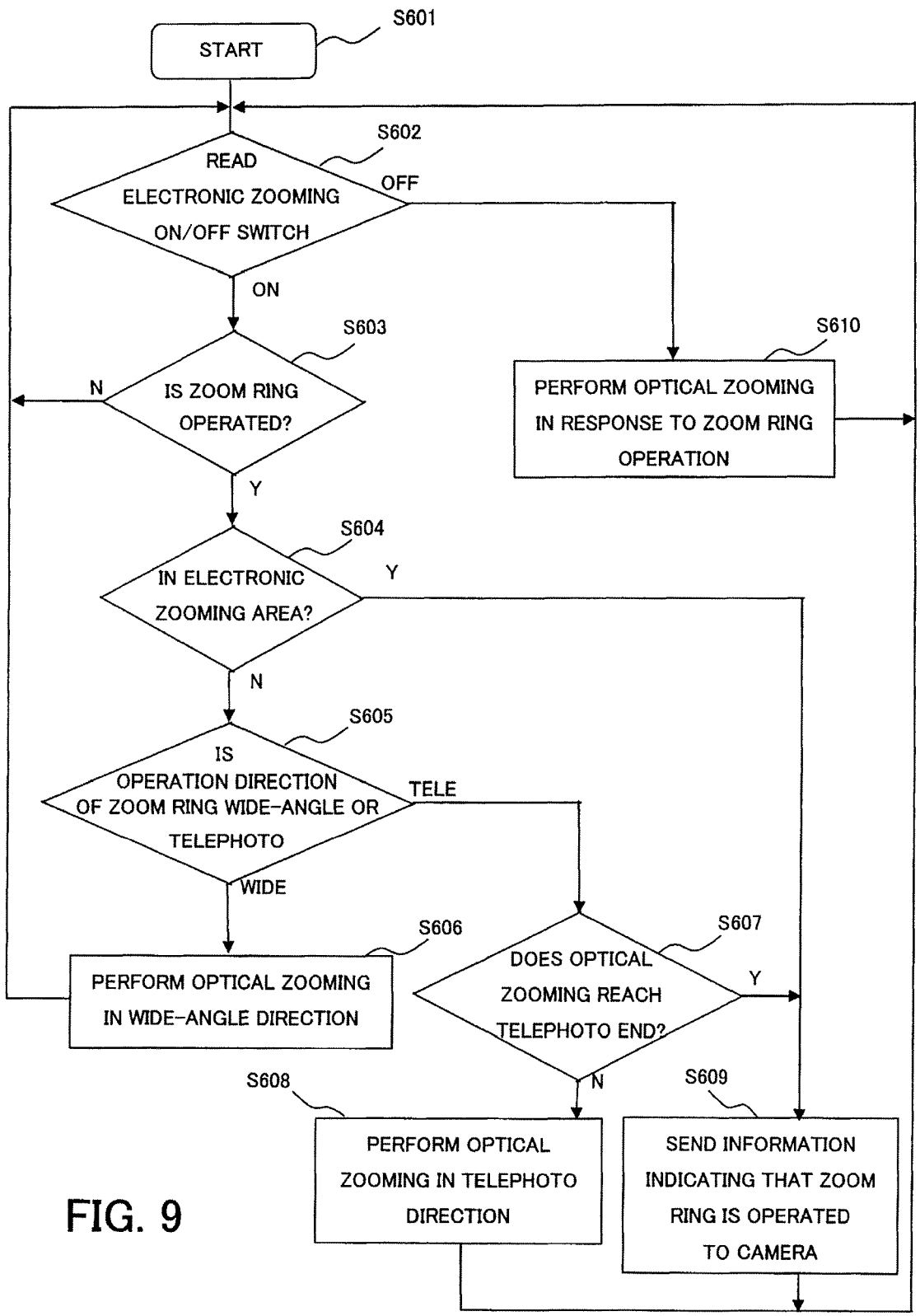
FIG. 9 is a flowchart showing the operation of the lens CPU in Embodiment 3.

The lens CPU 15 starts its operation at step 601 shown in FIG. 9 first. At step 602 the lens CPU 15 reads the state of the electronic zooming ON/OFF switch 31. If the switch 31 is OFF, since the only means to obtain the zooming effect is the optical zooming, the process proceeds to step 610 to perform the optical zooming in response to operation of the zoom ring 32. Specifically, the lens CPU 15 detects the rotation of the zoom ring 32 with the ring rotation detector 33, and then controls the zoom actuator 11 according to the detected rotation direction and amount (or speed) to move the magnification-varying lens unit 4.

At step 602, if the electronic zooming ON/OFF switch 31 is ON, the process proceeds to step 603. Information indicating the state of the electronic zooming ON/OFF switch 31 is sent from the lens CPU 15 to the camera CPU 23.

At step 603 the lens CPU 15 detects whether or not the zoom ring 32 is operated through the ring rotation detector 33. If the zoom ring 32 is not operated, the process returns to step 602. If the zoom ring 32 is operated, the process proceeds to step 604.

At step 604 the lens CPU 15 determines whether or not the magnification of the electronic zooming in the camera 90 is larger than 1, in other words, whether or not enlargement of the displayed image by the electronic zooming is performed.

Hereinafter, the state in which the enlargement of the displayed image by the electronic zooming is performed is referred to as a state in which the zooming position is in an electronic zooming range. When the zooming position is in the electronic zooming range, the optical zooming position is at the telephoto end.

If the zooming position is not in the electronic zooming range, the process proceeds to step 605 to determine whether the operation direction of the zoom ring 32 is a wide-angle direction or a telephoto direction. If the operation direction is the wide-angle direction, the process proceeds to step 606 to perform the optical zooming in the wide-angle direction. If the operation direction is the telephoto direction, the process proceeds to step 607.

At step 607 the lens CPU 15 determines whether or not the optical zooming position is at the telephoto end. If the optical zooming position is not at the telephoto end, the process proceeds to step 608 to perform the optical zooming in the telephoto direction. If the optical zooming position is at the telephoto end, the process proceeds to step 609. At step 609, the lens CPU 15 sends information on the rotation direction and amount (or speed) detected by the ring rotation detector 33 to the camera CPU 23. At the same time, the lens CPU 15 sends information indicating that the magnification-varying lens unit 4 is at the telephoto end to the camera CPU 23. The information is displayed on the electronic viewfinder 29 provided on the camera 90.

Figure 10:
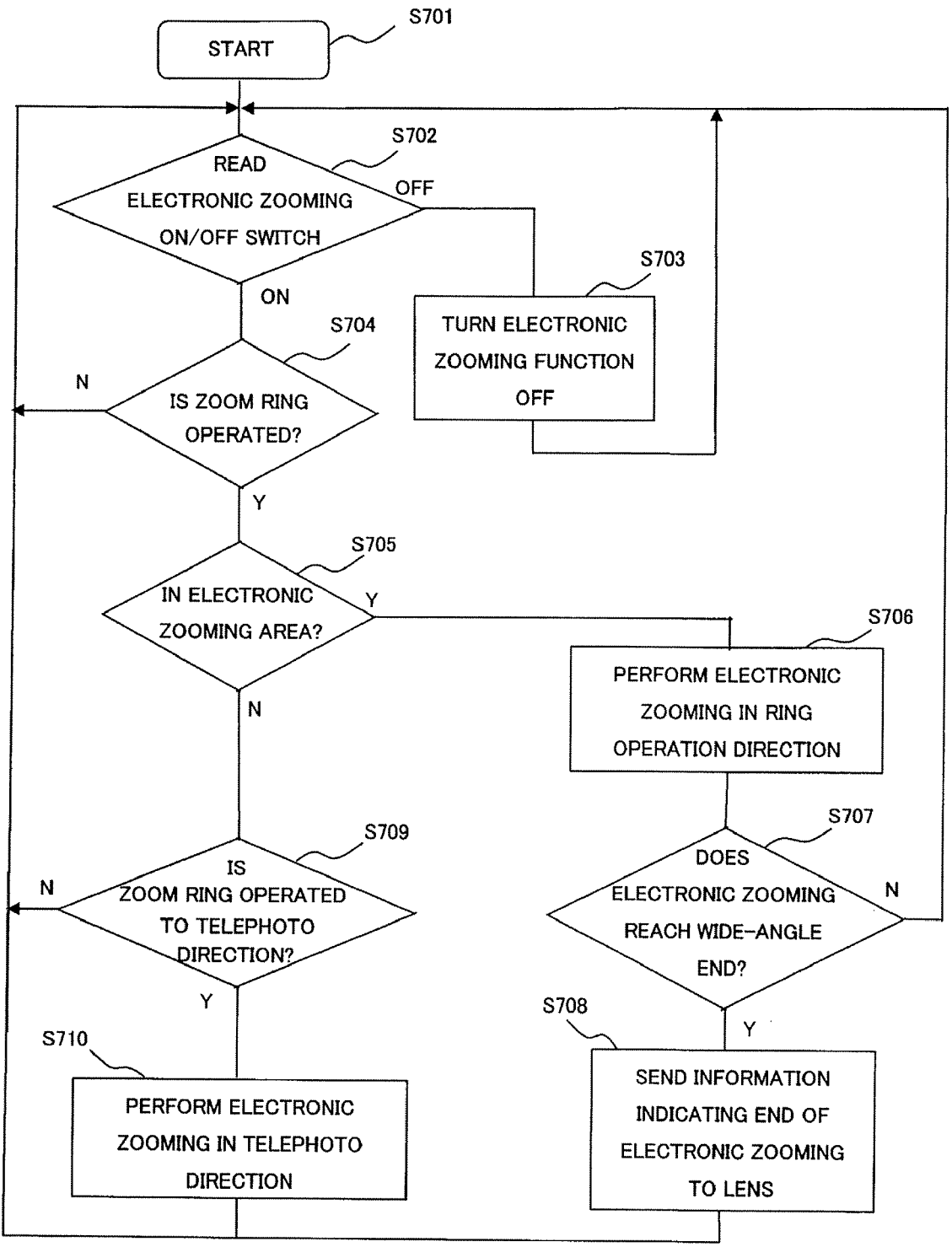
FIG. 10 is a flowchart showing the operation of the camera CPU in Embodiment 3.

On the other hand, the camera CPU 23 starts its operation at step 701 shown in FIG. 10. At step 702 the camera CPU 23 determines whether the electronic zooming ON/OFF switch 31 is ON or OFF according to the information received from the lens 80. If OFF, the process proceeds to step 703 to stop the operation of the electronic zooming control circuit 34 (that is, to fix the electronic zooming magnification to 1). Then, the process returns to step 702. If ON, the process proceeds to step 704.

At step 704 the camera CPU 23 determines whether or not the zoom ring 32 is operated according to information received from the lens 80. If not operated, the process returns to step 702. If operated, the process proceeds to step 705.

At step 705 the camera CPU 23 determines whether or not the zooming position is in the electronic zooming range. If the zooming position is in the electronic zooming range, the process proceeds to step 706 to cause the electronic zooming control circuit 34 to perform the electronic zooming based on the information on the rotation direction and amount (or speed) of the zoom ring 32 received from the lens 80.

Next, at step 707 the camera CPU 23 determines whether or not the electronic zooming position reaches the wide-angle end. If the electronic zooming position reaches the wide-angle end, the process proceeds to step 708 to send information indicating that the electronic zooming position reaches the wide-angle end and is not in the electronic zooming range to the lens CPU 15. Then, the process returns to step 702.

On the other hand, if the zooming position is not in the electronic zooming range at step 705, the process proceeds to step 709. At step 709 the camera CPU 23 determines whether or not the rotation direction of the zoom ring 32 received from the lens 80 is the telephoto direction. If the rotation direction is the wide-angle direction, the process returns to step 702. If the rotation direction is the telephoto direction, the process proceeds to step 710 to cause the electronic zooming control circuit 34 to perform the electronic zooming in the telephoto direction based on the information on the rotation direction and amount (or speed) of the zoom ring 32 received from the lens 80. Then, the process returns to step 702.

As described above, according to this embodiment, the optical zooming function provided in the lens 80 can be controlled by operation of the zoom ring 32 when the electronic zooming ON/OFF switch 31 provided on the camera 90 is OFF. On the other hand, the electronic zooming function provided in the camera 90 can be controlled by operation of the zoom ring 32 when the electronic zooming ON/OFF switch 31 is ON. Therefore, it is possible to perform operation of zooming including the optical zooming and the electronic zooming smoothly without releasing the hand from the zoom ring 32.

In the next embodiment, the description will be made of the positional relationship of the electronic zooming ON/OFF switch 31 and the zoom ring 32.

Embodiment 4

Figure 11:
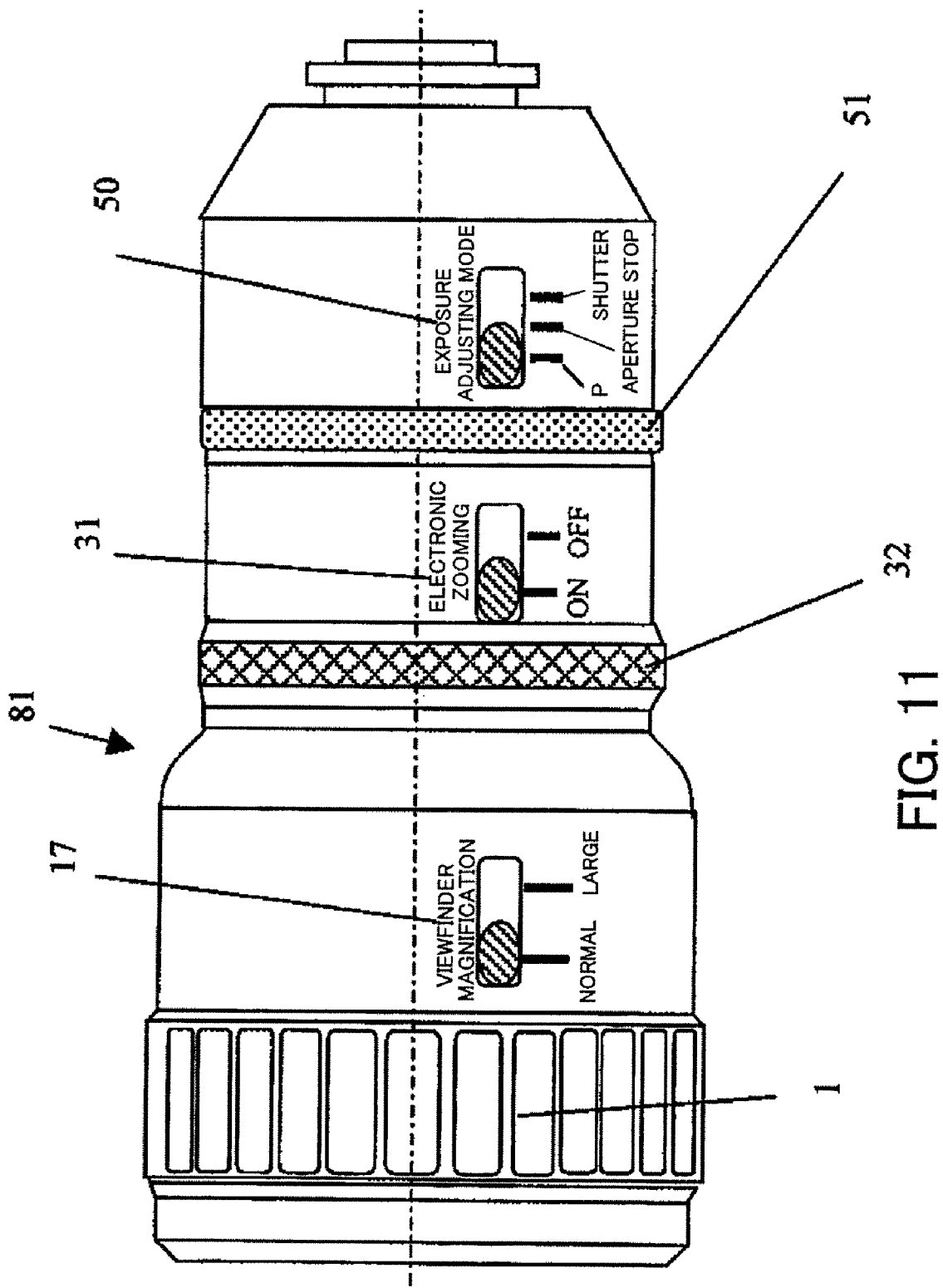
FIG. 11 is an external view of the interchangeable lens that is Embodiment 4 of the present invention.

FIG. 11 shows the exterior of an interchangeable lens 81 that is Embodiment 4 of the present invention. The interchangeable lens 81 of this embodiment is provided with the zoom ring 32 and the electronic zooming ON/OFF switch 31, which were described in Embodiment 3, and the focus ring 1 and the viewfinder magnification changing switch 17, which were described in Embodiment 1. Further, the interchangeable lens 81 is provided with an exposure adjusting ring 51 and an exposure adjusting mode setting switch 50, which will be described later.

The viewfinder magnification changing switch 17 is located in a region where operation thereof by the thumb of an operator's hand placed on the focus ring 1 is performed when operating manual focusing, as described in Embodiment 1. In FIG. 11, the viewfinder magnification changing switch 17 is located at a position closer to the focus ring 1 than to the other rings 32, 51 and the other switches 31, 50.

In addition, the electronic zooming ON/OFF switch 31 is also located in a region where operation thereof by the thumb of the operator's hand (generally the left hand) placed on the zoom ring 32 is performed when operating zooming. In other words, the electronic zooming ON/OFF switch 31 is located at a position closer to the zoom ring 32 than to the other rings 1, 51 and the other switches 17, 50.

Therefore, the changeover between use and nonuse of the electronic zooming can be performed without releasing the hand from the zoom ring 32. Further, as described above, the optical zooming provided in the lens 81 and the electronic zooming provided in the camera 90, which are used in conjunction with each other as zooming functions in image pickup, can be controlled by operation of the zoom ring 32. Accordingly, the operations relating to zooming can be performed on the lens side, thereby making it possible to perform smooth image pickup.

The exposure adjusting mode setting switch (a first operating member) 50 is a switch having three switching positions 'aperture stop', 'shutter speed (abbreviated as 'SHUTTER' in the figure)' and 'program (abbreviated as 'P' in the figure)'.

In a state in which a dial provided on the camera 90, not shown, is operated to a position of 'AE off' or 'AE lock', the switch 50 can be set to the 'aperture stop' position. In this state, when the exposure adjusting ring (a second operating member) 51 is rotationally operated, the lens CPU 15 detects the rotation direction and amount of the ring 51 through a ring rotation detector, not shown. The lens CPU 15 controls drive of an aperture stop unit 5 provided in the interchangeable lens 81 based on the detection result. Thereby, exposure adjustment can be performed manually.

In the similar state in which the switch 50 is set to the 'shutter speed' position, when the exposure adjusting ring 51 is rotationally operated, the lens CPU 15 sends information indicating the rotation direction and amount of the ring 51 to the camera CPU 23. The camera CPU received the information controls the charge accumulation time of an image-pickup element 24 (that is, the shutter speed of an electronic shutter) according to the rotation direction and amount of the ring 51.

Furthermore, there is a case where, when exposure according to brightness of an object is controlled by the combination of the aperture diameter (aperture value) of the aperture stop unit 5 and the shutter speed, that control is performed according to a so-called program diagram stored in a memory provided in the camera. In this case, the switch 50 is set to the 'program' position.

When the exposure adjusting ring 51 is rotationally operated, the lens CPU 15 sends information indicating the rotation direction and amount of the ring 51 to the camera CPU 23. The camera CPU received the information changes the aperture value and the shutter speed on the program diagram according to the rotation direction and amount of the ring 51. The camera CPU 23 commands the lens CPU 15 to control the aperture value, and thereby the lens CPU 15 drives the aperture stop unit 5. In a case where plural program diagrams are provided, the same number of 'program' positions may be provided.

As described above, various exposure adjusting functions provided in the lens 81 and the camera 90 can be controlled by operations of the exposure adjusting mode setting switch 50 and the exposure adjusting ring 51.

As described above, according to each of the embodiments, the functions provided in the camera can be controlled by operation of the switch provided on the interchangeable lens. Especially, the switch is located near the operating ring for controlling the lens-side function that is used in conjunction with or strongly-related to the camera-side function controlled by the switch. Therefore, the camera operator can operate the switch for using the camera-side various functions by his/her hand placed on the operating ring, thereby making it possible to perform smooth image pickup.

Furthermore, according to Embodiments 3 and 4, operating the switch provided on the interchangeable lens enables control of the lens-side function and the camera-side function through the operating ring provided on the interchangeable lens. In other words, operating the switch can change the function to be controlled between the lens-side one and the camera-side one. In addition, the switch for using the lens-side function and the camera-side function can be operated by the hand placed on the operating ring, thereby making it possible to perform smooth image pickup.

Furthermore, the present invention is not limited to these preferred embodiments and various variations and modifications may be made without departing from the scope of the present invention.

This application claims foreign priority benefits based on Japanese Patent Application No. 2005-260335, filed on Sep. 8, 2005, which is hereby incorporated by reference herein in its entirety as if fully set forth herein.

What is claimed is:

1. A lens apparatus detachably mountable on an image-pickup apparatus, the lens apparatus comprising:
   a first operating member on the lens apparatus for changing a display mode of an electronic view finder provided in the image-pickup apparatus between a normal mode in which an entire area of an image is displayed and a large mode in which a partial area of the image is enlarged and displayed;
   a second operating member on the lens apparatus for selecting one of an auto focus mode or a manual focus mode; and
   a controller which outputs a signal for changing the display mode to the large mode in response to operation of the first operating member only during when the lens apparatus is operating in the manual focus mode, and outputs a signal for keeping the display mode in the normal mode, even when the large mode is selected, when the lens apparatus is operating in the auto focus mode.

* * * * *